(12) United States Patent
Atsalakis et al.

(10) Patent No.: US 6,186,272 B1
(45) Date of Patent: Feb. 13, 2001

(54) TRAILER FOR PAINTING

(75) Inventors: Tony Atsalakis; Nicholas S. Atsalakis; George M. Atsalakis; Konstantinos Bakalis, all of Grosse Pointe Park, MI (US)

(73) Assignee: Atsalis Bros. Painting, Clinton Twp., MI (US)

( * ) Notice: Under 35 U.S.C. 154(b), the term of this patent shall be extended for 0 days.

(21) Appl. No.: 09/024,200

(22) Filed: Feb. 17, 1998

Related U.S. Application Data

(60) Provisional application No. 60/038,772, filed on Feb. 18, 1997.

(51) Int. Cl.$^7$ ............................................. E04G 1/22
(52) U.S. Cl. ................................. 182/63.1; 182/141
(58) Field of Search ........................ 182/63.1, 69.4, 182/69.6, 141, 149; 451/87, 453

(56) References Cited

U.S. PATENT DOCUMENTS

| | | |
|---|---|---|
| 3,356,181 | 12/1967 | Granger . |
| 3,690,092 | 9/1972 | Ross et al. . |
| 4,259,886 * | 4/1981 | Seid et al. ............................ 83/425.2 |
| 4,429,764 | 2/1984 | Park . |
| 4,535,894 * | 8/1985 | Shell .................................... 209/665 |
| 4,787,179 * | 11/1988 | Lewis ................................. 451/87 X |
| 4,852,307 * | 8/1989 | Goudeau ............................ 451/87 X |
| 4,852,687 | 8/1989 | Hittler . |
| 4,962,828 * | 10/1990 | Duncan ............................ 182/141 X |
| 5,011,710 | 4/1991 | Harrison . |
| 5,067,504 | 11/1991 | Coleman, III . |
| 5,381,872 * | 1/1995 | Peruzzi et al. ...................... 182/63.1 |
| 5,417,301 * | 5/1995 | Wildner ............................... 182/63.1 |
| 5,484,035 * | 1/1996 | Wildner ............................... 182/63.1 |
| 5,485,925 * | 1/1996 | Miller et al. ......................... 209/615 |
| 5,542,495 * | 8/1996 | Aulakh ................................ 182/63.1 |
| 5,622,571 * | 4/1997 | Derlein ............................... 134/22.11 |
| 5,785,148 * | 7/1998 | Wildner .......................... 182/63.1 X |

* cited by examiner

*Primary Examiner*—Daniel P. Stodola
(74) *Attorney, Agent, or Firm*—Clark & Brody

(57) ABSTRACT

An apparatus for cleaning bridges or other elevated structures includes a base element and an upper element that is vertically movable with respect to the base element. The upper element supports workmen for cleaning the structure. The floor of the upper element is made of a grid or grating such that debris falls through the floor and is collected in the base element. The base forms a collection hopper and includes a conveyor running along the center for carrying the debris to one end of the base for discharge of the debris. Hydraulic cylinders control the vertical position of the upper element so that the upper element may be placed at the desired elevation. The base element includes wheels and a hitch for allowing the apparatus to be towed on the highway to the structure to be cleaned or repaired.

12 Claims, 5 Drawing Sheets

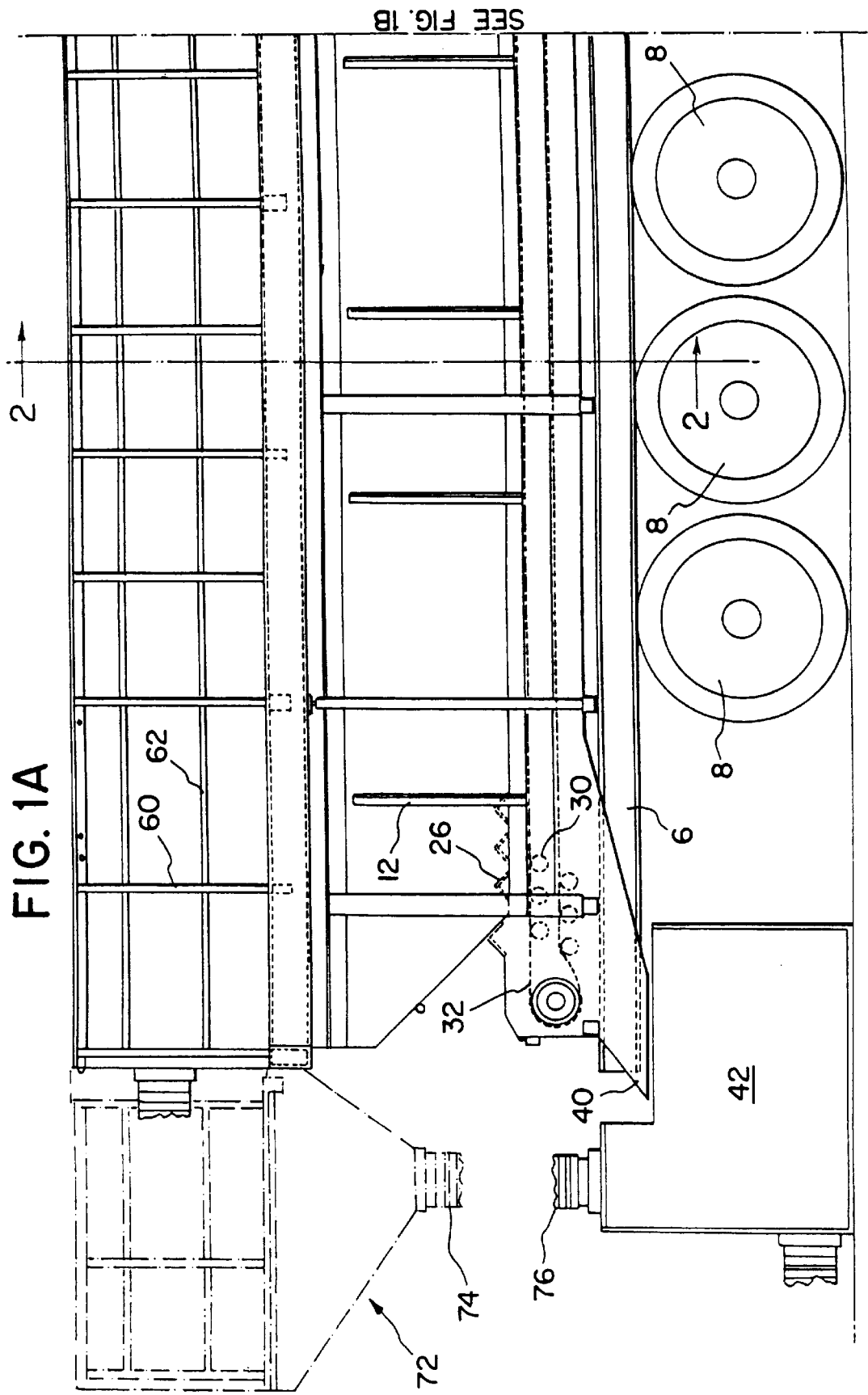

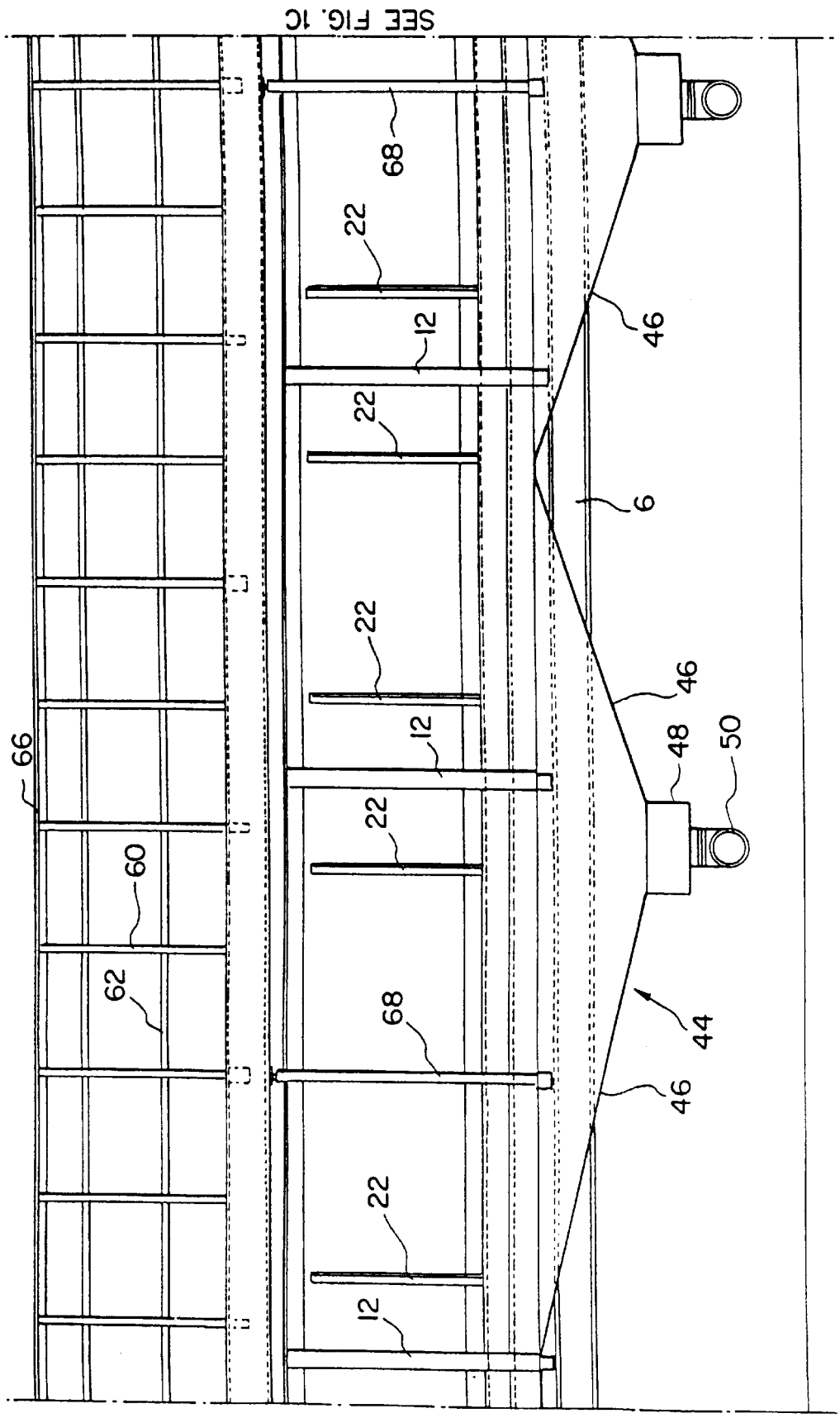

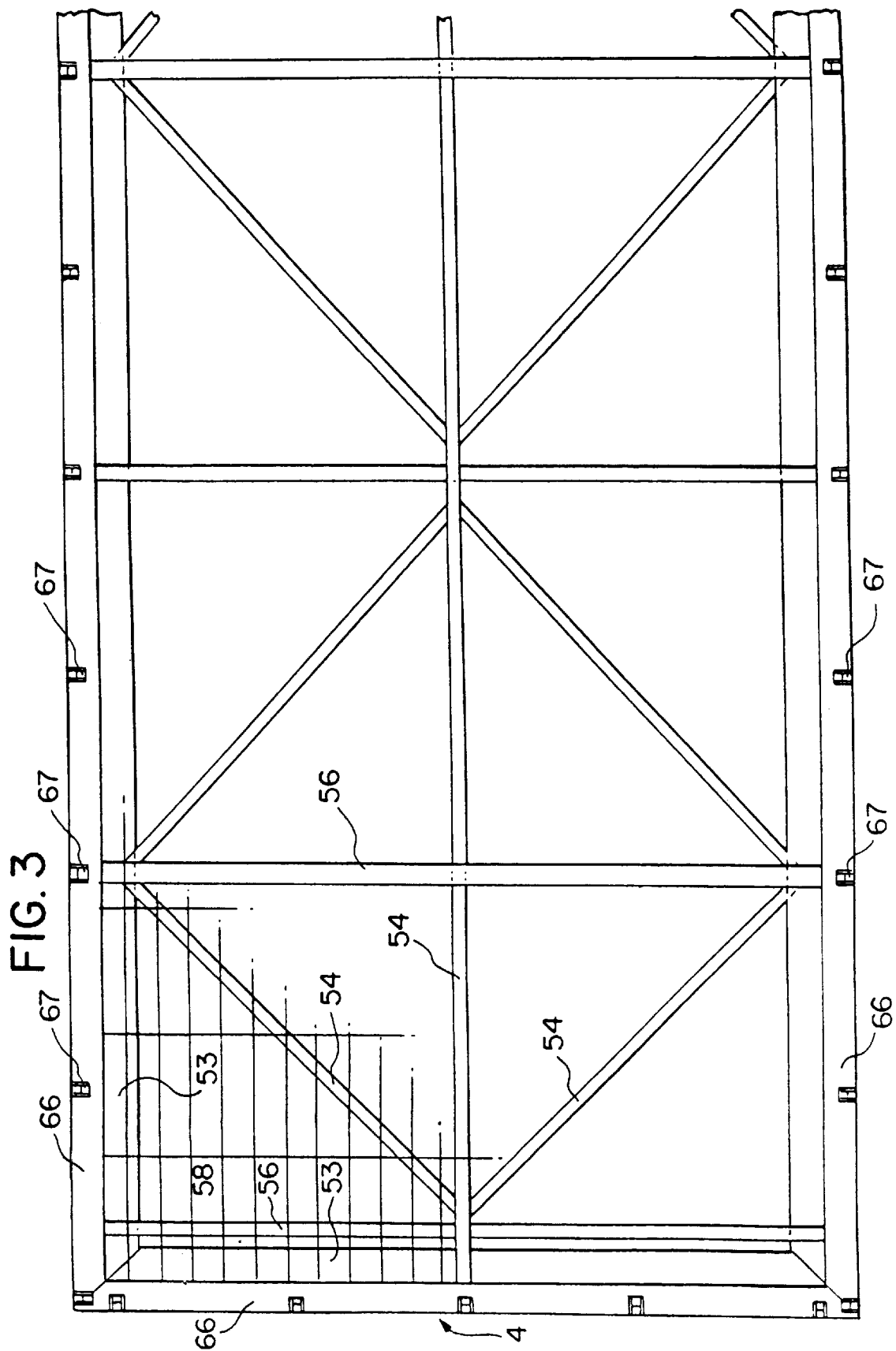

TRAILER FOR PAINTING

CROSS REFERENCE TO PROVISIONAL APPLICATION

This application claims priority of U.S. Provisional Patent Application Ser. No. 60/038,772, which was filed on Feb. 18, 1997.

TECHNICAL FIELD

This invention relates to a multipurpose apparatus for use in sandblasting, painting, repairing, and maintaining elevated structures. The invention is particularly useful for sandblasting and painting the undersides of highway bridges.

BACKGROUND

Proper maintenance of many structures requires that they be sandblasted, painted, and repaired regularly. This is particularly true of structures such as bridges, which often include elements of metal and other easily degraded materials that are subjected to harsh weather. In the case of highway bridges subjected to road chemicals, including salt applied for wintertime driving, the bridge must usually be cleaned thoroughly before repainting.

Cleaning and repainting a highway bridge often involves sand blasting of the underside of the bridge prior to painting, and the sand and debris must be recovered for environmental reasons. Sandblasting and painting the bottom of a bridge requires the provision of lifts, ladders, scaffolding or the like to allow the workmen access to the structure to be maintained.

Known devices for repair of elevated structures are shown in U.S. Pat. Nos. 4,429,764 (Park); 4,852,687 (Hittler); 5,067,504 (Coleman, lll); and U.S Pat. Nos. 5,011,710 (Harrison). Other devices for working on elevated structures, such as devices for use in picking fruit, are shown in U.S Pat. No. 3,690,092 (Ross); and U.S Pat. No. 3,356,181 (Granger).

SUMMARY OF THE INVENTION

In accordance with the invention, a portable trailer is provided for assisting workmen in the cleaning, repairing, and painting of the underside of a highway bridge. The trailer has wheels and is sized so that it may be towed on a highway to the bridge to be maintained. The trailer includes a base supported by the wheels and an upper part that is vertically movable with respect to the base. The upper part provides a walkway for the workers and may be raised to a position adjacent the bottom of the bridge to allow workers access to the bridge structure. The workers may clean and paint the bridge from that location.

The top surface of the upper part, preferably including the walkway, is formed of a grating or grid having openings whereby sand used for the cleaning and the debris removed from the bridge will fall through the top surface and into the base part of the trailer. The base part includes hoppers for directing the sand and debris onto a conveyor that extends longitudinally along the bottom of the base part. The conveyor carries the sand and debris along the base element and deposits it outside the base element where it may easily be picked up by ordinary equipment, such as a front loader, and loaded into a truck for disposal.

The base element also includes large conduits for attachment to one or more fans for establishing a flow of air from the bridge and into the hoppers to ensure that the sand, debris, and dust are captured in the base element. The exhaust air is filtered further to remove the sand and dust to retain them in the base element. The workers, thus, are provided with far cleaner air in their work area, and sand and debris are recovered for disposal or, possibly, reclamation and reuse of the sand.

DESCRIPTION OF THE DRAWINGS

FIGS. 1a, 1b, and 1c are serial side views of a trailer in accordance with the invention.

FIG. 2 is a cross section taken along line 2—2 of FIG. 1a.

FIG. 3 is a partial top view of the upper element.

DETAILED DESCRIPTION OF THE PREFERRED EMBODIMENT

Figure 1C:
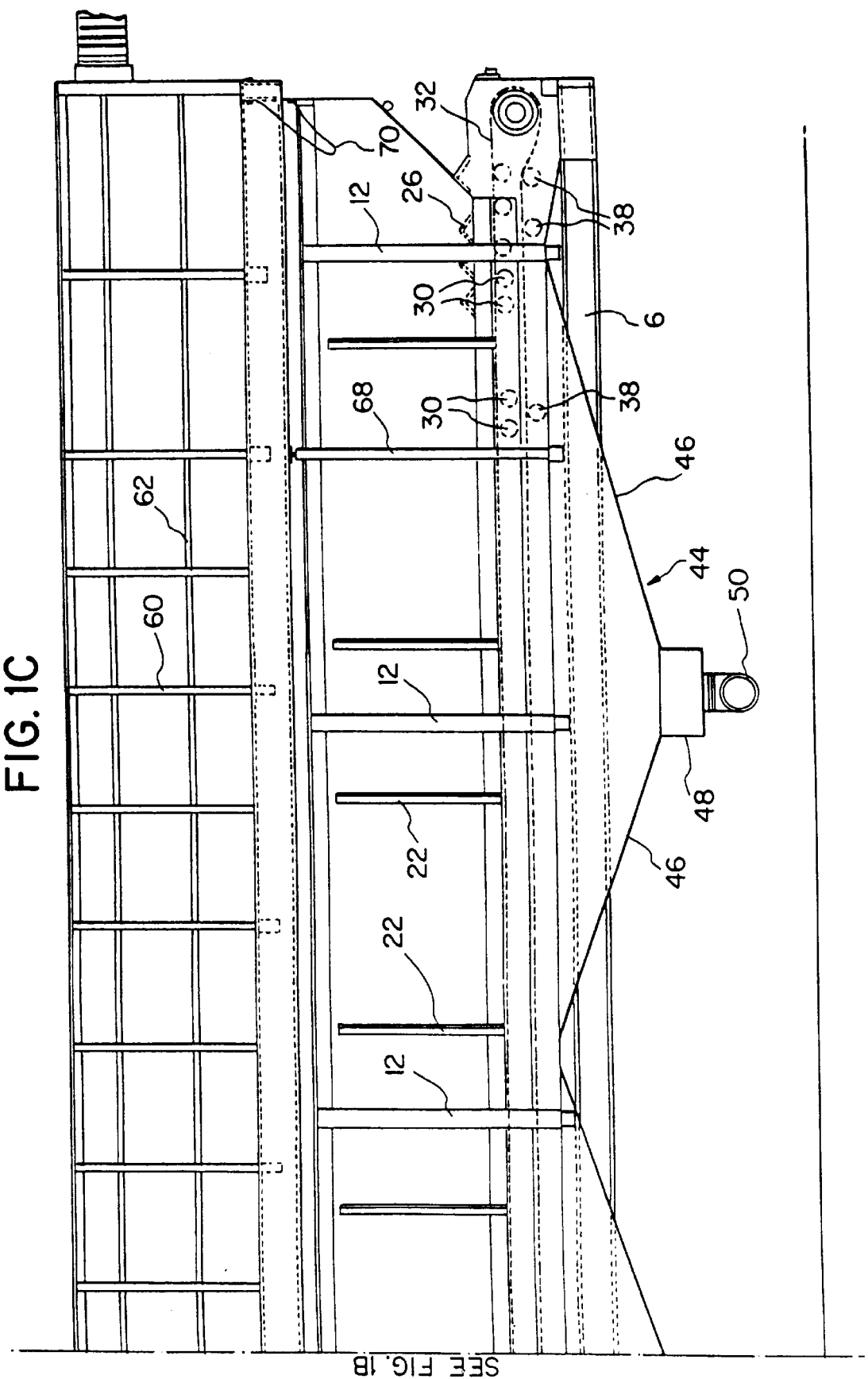
Figure 2:
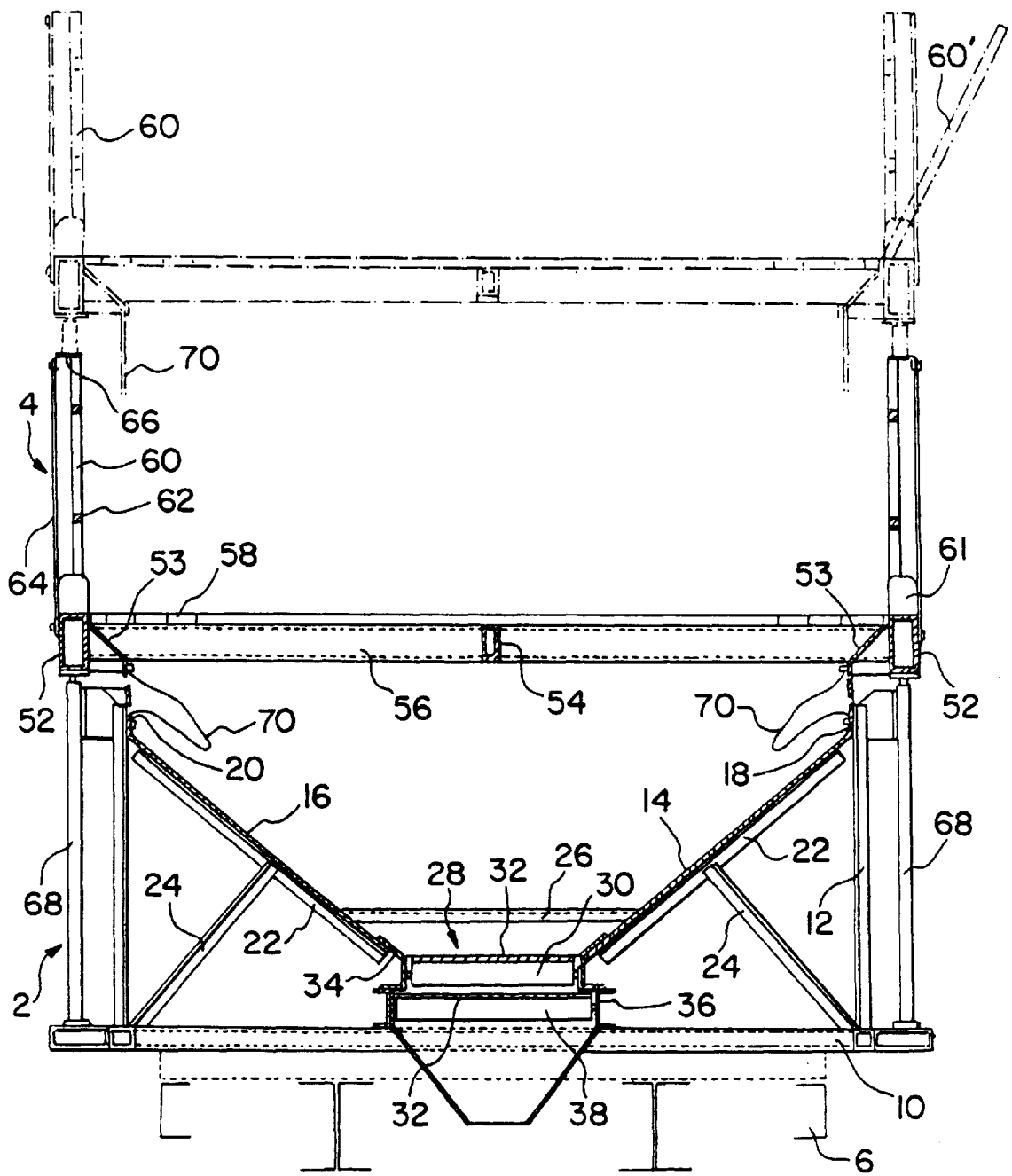

With reference to FIGS. 1 and 2, a trailer in accordance with the invention includes a base element 2 and a vertically-movable upper element 4 mounted to the base element. The base element is supported by longitudinal frame elements 6, which are mounted to a set of wheels 8, located near one end of the trailer in known manner. A hitch, not shown, is provided at the other end of the trailer for attaching it to a truck for towing.

Base element 2 comprises a bottom, generally rectangular frame 10 and a plurality of vertical supports 12. A hopper is formed by sides having tapered portions 14 and 16 and vertical portions 18 and 20. The upper portions are attached, as by bolts, to the upper ends of the vertical supports 12. The tapered sides are strengthened by support brackets 22 and 24 and cross braces 26. The upper part of the base is open to receive sand and debris from the cleaning of the highway structure, as will be explained further below.

The sand and debris collected in the hopper are directed toward the center of the hopper by the tapered sides, whereby they engage a conveyor 28. The conveyor transports the sand and debris longitudinally along the trailer for collection. The conveyor comprises a plurality of support rollers 30, which support a conveyor belt 32. The rollers are mounted on support brackets 34, which are attached to the bottoms of the tapered sides and to support beams 36. The support beams 36 are, in turn, attached to the bottom rectangular frame 10. Return rollers 38 are mounted to the beams 36 and support the conveyor 32 on its return path.

A discharge chute 40 located at the rear of the trailer directs material discharged over the end of the conveyor 28 into a collection box 42. Thus, sand and debris that is discharged from the bridge, falls into the hopper and is carried longitudinally along the hopper by the conveyor belt for discharge into the collection box 42.

Intermediate the ends of the trailer are clean-out hoppers 44. Each of these clean-out hoppers is located beneath the conveyor 28 and includes tapered sides 46 leading to clean-out box 48, which extends transversely across the bottom part of the trailer. A clean-out pipe 50 allows access to the box 48 for removing the sand and debris that have fallen past the conveyor.

The upper element will be described in more detail with reference to FIGS. 2 and 3. This element includes an outer frame 52 and inner frame elements 54. Cross pieces 56 provide additional strength. The frame elements and the cross pieces support a grating or grid flooring 58. The flooring 58 provides a platform for workers and provides openings that allow sand and debris to pass and fall into the hopper. Angled flashing elements 53 are attached to the frame 52 to direct sand and debris toward the interior of the hopper. A railing is attached to the frame 52. The railing is formed by a plurality of vertical posts 60, which are attached to the frame 52, horizontal elements 62, which extend between the posts 60, and a cap element 66. The railing is preferably further covered by a flexible material 64, which assists in controlling air flow to provide a downward flow of air in the work area. The cover 64 is preferably attached at its upper end to the top of the rail by cords that engage brackets 67 and at its lower end to the frame 52.

The vertical posts on the sides of the trailer are preferably pivotally attached to the frame 52, such as by the use of hinges 61. These hinges allow the railing to tilt outward as shown at 60' in FIG. 2. This increases the horizontal area available for the workers and allows, for example, access to a portion of a bridge undergoing maintenance that is beyond the perimeter of the trailer. Because the outwardly tilted side rail is not generally strong enough to support the entire weight of a worker, the worker may use the side rail only for partial support when working on the outlying parts of the bridge. The portions of the railing on the ends of the trailer lock into the portions on the sides when the side portions are vertical to provide increased strength to the rails when in that position. The hinges include one or more locking pins (not shown), or the like, to secure the side rails in the vertical and in one or more outward positions.

With reference to FIG. 2, hydraulic cylinders 68 extend between the bottom of the base element 2 and the bottom of the upper element. These cylinders control the vertical position of the upper element whereby it may be raised or lowered to accommodate the height of the bridge or other structure being repaired. The cylinders are generally operated in known manner by controlling hydraulic pumps, which have not been illustrated. FIG. 2 illustrates a raised position of the upper element in phantom lines. Flexible sheets 70 are attached to the inner part of the trailer between the flashing elements 53 and the top of the base element. These sheets seal the area between the base and the upper element when the upper element is raised. Thus, the sand and debris falling through the upper element cannot escape, and they are collected in the hopper.

A diesel-powered generator (not shown) is provided for operating a hydraulic pump that provides power for the hydraulic system. As well, the generator provides power for driving the conveyor belt, operating lighting systems, and operating various electrical tools through electrical outlets.

Referring again to FIG. 1, an extension hopper 72, having a floor grating and side rail much like the upper element already described, may be attached to the end of the upper element to provide additional length for working on wider bridges. The outlet 74 to the hopper is connected to the inlet of the collection box 42 whereby sand and debris are collected.

Modifications within the scope of the appended claims will be apparent to those of skill in the art.

What is claimed is:

1. Apparatus for maintenance of an elevated structure comprising a transportable base element and a vertically movable upper element mounted to said base element for controllable vertical motion with respect to said base element, wherein said base element comprises hopper means for collecting debris and conveyor means for carrying debris collected by said hopper means along said base element and for discharging said debris, and said upper element comprises platform means for supporting workers and allowing said debris to pass directly to said hopper means.

2. Apparatus according to claim 1 further comprising means for sealing the upper element to the base for preventing discharge of said debris between said upper and base elements.

3. Apparatus according to claim 2 wherein said means for sealing comprises a flexible sheet.

4. Apparatus according to claim 1 comprising wheels attached to said base element and arranged with respect to said base element such that said base and upper elements may be towed on a highway with said wheels in contact with said highway.

5. Apparatus according to claim 1 further comprising extensible means for controllably moving said upper element vertically with respect to said base element.

6. Apparatus according to claim 5 wherein said extensible means comprise hydraulic cylinders.

7. Apparatus according to claim 1 wherein said upper element further comprises a railing mounted for pivotal movement between a vertical orientation and an outwardly tilted orientation.

8. Apparatus according to claim 1 wherein said conveyor means comprises a conveyor belt that extends longitudinally along the length of said base element and said apparatus further comprises a discharge chute at one end of said base element in communication with said conveyor belt whereby material carried by said conveyor belt is transferred to said discharge chute.

9. A method for cleaning an elevated structure comprising the steps of providing a portable apparatus comprising a base element having a hopper for collecting debris and an upper element that supports workers, allows said debris to pass directly to said hopper, and is vertically adjustable with respect to said base element, moving said apparatus to a horizontal location near said structure, raising said upper element to a vertical location adjacent said structure, cleaning said structure, and allowing debris resulting from said cleaning to fall through said upper element directly to said hopper in said base element.

10. A method according to claim 9 wherein said apparatus is a trailer and said step of moving comprises pulling said apparatus to said horizontal location with a tractor.

11. A trailer for use in cleaning an elevated structure comprising:
   an elongate, wheeled lower element having a hopper and a conveyor,
   an upper element mounted to said lower element for vertical motion with respect to the lower element, the upper element having a platform for workers, the platform being permeable to said debris and the upper element being constructed such that debris passing said platform falls directly into said hopper, and
   extensible cylinders connected between said upper element and said lower element.

12. A trailer according to claim 11 wherein said hopper extends longitudinally along the major part of the length of said lower element.

\* \* \* \* \*